Figure 1:
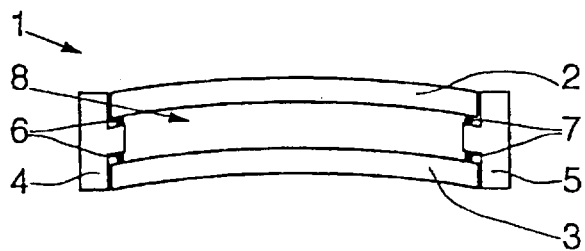

United States Patent [19]

Cano et al.

[11] Patent Number: 5,730,911
[45] Date of Patent: Mar. 24, 1998

[54] PROCESS FOR THE MANUFACTURE OF A SUBSTRATE MADE OF TRANSPARENT ORGANIC GLASS AND SUBSTRATE THUS OBTAINED

[75] Inventors: Jean-Paul Cano, Chennevières-sur-Marne, France; Steven Weber, Clearwater, Fla.; Pascale Tardieu, Paris; Nathalie Lelard, Saint-Maur-des Fossés, both of France

[73] Assignee: Essilor International-Compagnie General D'Optique, Charenton Cedex, France

[21] Appl. No.: 669,737

[22] Filed: Jun. 26, 1996

Related U.S. Application Data

[63] Continuation-in-part of Ser. No. 404,824, Mar. 14, 1995, abandoned.

[30] Foreign Application Priority Data

Mar. 14, 1995 [FR] France .................................. 95 02520

[51] Int. Cl.$^6$ .............................. B29D 11/00; G02C 7/10
[52] U.S. Cl. .............................. 264/1.1; 264/2.6; 264/2.7; 351/159; 351/163; 351/177
[58] Field of Search .............................. 264/1.1, 2.2, 2.6, 264/2.7; 351/159, 177

[56] References Cited

U.S. PATENT DOCUMENTS

| | | | |
|---|---|---|---|
| 4,166,043 | 8/1979 | Uhlmann et al. | 252/300 |
| 4,286,957 | 9/1981 | Le Naour-Sene | 8/471 |
| 4,289,497 | 9/1981 | Hovey | 252/300 |
| 4,367,170 | 1/1983 | Uhlmann et al. | 252/586 |
| 4,637,698 | 1/1987 | Kwak et al. | 351/163 |
| 4,774,035 | 9/1988 | Carmelite et al. | 264/1.4 |
| 4,880,667 | 11/1989 | Welch | 427/160 |
| 4,983,335 | 1/1991 | Matsuo et al. | 264/1.4 |
| 4,994,208 | 2/1991 | McBain et al. | 252/586 |
| 5,049,321 | 9/1991 | Galic | 264/1.7 |
| 5,066,818 | 11/1991 | Gemert et al. | 549/389 |
| 5,087,392 | 2/1992 | Burke et al. | 264/2.6 |
| 5,200,483 | 4/1993 | Selvig | 526/301 |
| 5,246,634 | 9/1993 | Ichikawa et al. | 264/2.7 |
| 5,405,557 | 4/1995 | Kingsbury | 264/2.2 |
| 5,415,816 | 5/1995 | Buazza et al. | 264/2.6 |
| 5,541,247 | 7/1996 | Koike | 264/1.1 |

FOREIGN PATENT DOCUMENTS

| | | |
|---|---|---|
| 9071830 | 4/1984 | Japan . |
| 2050336 | 8/1987 | Japan . |

OTHER PUBLICATIONS

JPA 4-255308, Sekisui Chemical Industries, "Method for Producing an Artificial Marble Product,", pp. 1-5, AR/MJC/2-22-96.

JPA 4-255311, Sekisui Chemical Industries, "Method for Producing an Artificial Marble Product," AR/MJC/05-03/96.

*Primary Examiner*—Tae Yoon
*Attorney, Agent, or Firm*—Martin Fleit

[57] ABSTRACT

The process comprises:
(a) the introduction into a mould of a composition which is polymerizable into a transparent organic glass
(b) the polymerization of the composition under conditions such that the resulting substrate made of transparent organic glass has at least one thin surface layer polymerized to a degree of progression and/or of crosslinking which is appreciably lower than that of the remainder of the substrate,
and optionally (c) a stress-relieving thermal anneal of the substrate.

Application to the manufacture of finished or semi-finished optical or ophthalmic items, in particular photochromic optical or ophthalmic items.

17 Claims, 3 Drawing Sheets

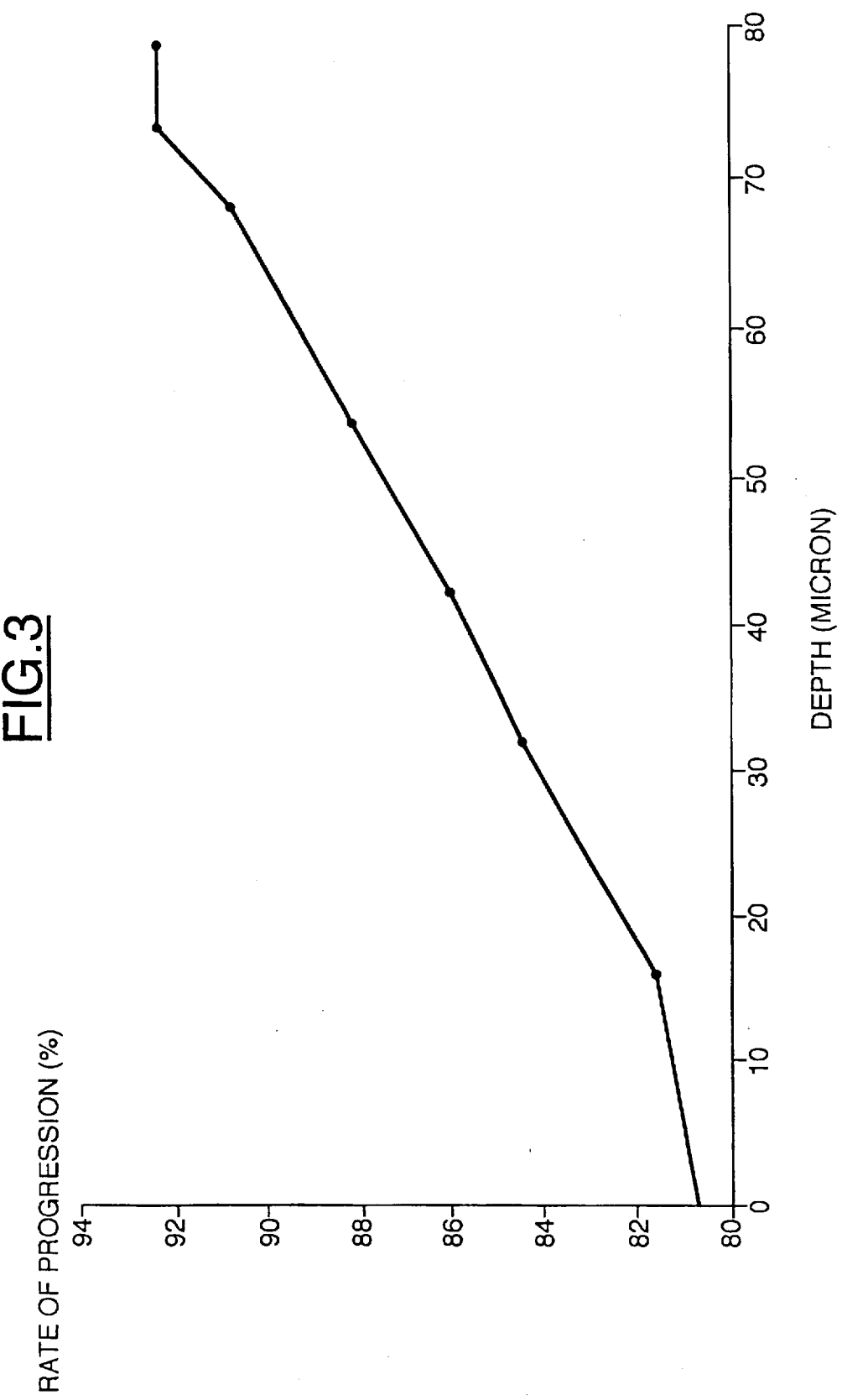

PROCESS FOR THE MANUFACTURE OF A SUBSTRATE MADE OF TRANSPARENT ORGANIC GLASS AND SUBSTRATE THUS OBTAINED

This is a CIP of U.S. application Ser. No. 08/404,824 filed on Mar. 14, 1995, now abandoned.

The present invention generally relates to a new process for the manufacture of substrates made of transparent organic glass and to new substrates made of transparent organic glass, for example optical and ophthalmic items made of transparent organic glass such as optical and ophthalmic lenses and spectacle glasses.

The new manufacturing process is very particularly suitable for the manufacture of substrates and items made of photochromic transparent organic glass that is to say substrates and its comprising a photochromic substance capable of reversibly changing in colour or opaqueness when they are exposed to specific radiation.

"Substrate made of transparent organic glass" is understood to mean a substrate made of transparent organic polymer material having a transparency suitable for optical and/or ophthalmic applications.

Optical and ophthalmic items made of organic glass can be obtained in their definitive form by pouring an appropriate polymerizable composition between two parts, made of inorganic glass, of a mould having required surface geometries. The polymerizable composition is then polymerized. Optical and ophthalmic items, such as spectacle glasses or lenses, are thus obtained in which the two faces are found in their final state.

It is also usual to manufacture semi-finished optical and ophthalmic items containing, after moulding, a single face with its final geometry, it being possible for the second face then to be surfaced as requested.

The operation of surfacing the second face causes an increase in the temperature of the semi-finished item and it is essential for the organic glass or polymer constituting the item to be sufficiently rigid and non-deformable at the temperature reached. The organic glass must, for this reason, have good thermomechanical properties which will also be necessary for all the subsequent treatment operations such as varnishing, colouring or anti-reflection treatments.

In order to obtain photochromic substrates, the moulded substrates, after achieving complete polymerization of the polymerizable composition, are generally brought into contact with a photochromic substance which is made to diffuse into the substrates in order to form, in these substrates, a thin surface layer containing the photochromic substance.

A process which is particularly suitable for producing a photochromic item or substrate is the process, known as "thermal transfer", described in U.S. Pat. No. 4,286,957.

Briefly, this process consists in applying, to at least one surface of the substrate made of moulded organic glass, a layer of a material containing a photochromic organic substance and in then heating the thus coated substrate in order to implant the photochromic substance in the part of the substrate underlying the surface coated with the photochromic material and thus to form a thin surface layer containing a photochromic substance in the substrate.

The important properties for the photochromic substances used in the optical and ophthalmic items are the kinetics of colouring/decolouring, the intensity of the colouring and the temperature range within which the photochromic substance is effective. As regards the kinetics of the colouring/decolouring, it is important that the rate of colouring or of decolouring of the optical or ophthalmic item as a function of the intensity of the incident radiation is as high as possible. Also, it is important to obtain an intensity of colouring which is sufficient to provide good protection. These two properties of the photochromic substances depend on the nature of the substrate (host material).

Polymerizable compositions which are particularly suited to the manufacture of optical and ophthalmic items are polymerizable compositions containing, as main component, allyl carbonate monomers of polyols and in particular diethylene glycol diallyl carbonate.

Although photochromic items manufactured with such photopolymerizable compositions have suitable photochromic properties, the latter are far from being optimum for optical and ophthalmic items such as optical and ophthalmic lenses and spectacle glasses.

In order to improve the photochromic properties of optical and ophthalmic items, modified polymerizable compositions have been proposed in U.S. Pat. No. 4,994,208 and in particular the addition of certain aliphatic urethanes to the polymerizable compositions based on allyl carbonate monomers of polyols. The copolymer obtained, used for the manufacture of photochromic items, has an improved photochromic response, in particular in comparison with photochromic items formed from a homopolymer. However, the polymerizable compositions described in this U.S. Pat. No. 4,994,208 have the disadvantage of having a relatively short storage life.

It has been proposed in U.S. Pat. No. 5,200,483, in order to overcome this fault of poor storage life of the compositions described in U.S. Pat. No. 4,994,208, to modify these polymerizable compositions by addition of a specific mixture of aliphatic urethanes.

Thus, in order to obtain optical and ophthalmic items having optimum photochromic properties, it is necessary to use specific compositions for the manufacture of these items, which very obviously limits the choice of organic glasses which can be used by those skilled in the art.

In addition, the organic glasses obtained from these specific compositions generally have reduced mechanical properties, in particular thermomechanical properties, so that the photochromic optical and ophthalmic items generally result from a compromise between obtaining the best photochromic properties and mechanical properties, in particular thermomechanical properties, which are adequate for the item.

Obtaining suitable thermomechanical properties is a characteristic which is particularly important in the case of semi-finished optical and ophthalmic items. Indeed, the subsequent surfacing operation of the non-finished face of the article causes heating of the semi-finished item and contains a high risk of deformation of and damage to the item if the latter does not have satisfactory thermomechanical properties.

The subject of the present invention is a process for the manufacture of substrates and items made of crosslinked transparent organic glass which overcomes the above disadvantages and in particular which makes possible the use of a wide range of polymerizable compositions in the manufacture of photochromic optical and ophthalmic substrates and items having both improved mechanical properties, in particular thermomechanical properties, and photochromic properties.

Crosslinked organic glass is understood to mean an organic polymer which forms a three-dimensional network.

In the continuation of the description and claims, transparent organic glass denotes a crosslinked transparent organic glass.

Another subject of the present invention is substrates and items made of finished or semi-finished transparent organic glass which are useful in the manufacture of finished or semi-finished photochromic optical and ophthalmic substrates and items having improved photochromic and thermomechanical properties, manufactured from a wide range of transparent organic glasses.

According to the invention, the above aims are achieved by a process for the manufacture of a substrate made of transparent organic glass which comprises:

(a) the introduction into a mould of a composition which is polymerizable into a transparent organic glass; and (b) the polymerization of the polymerizable composition under conditions such that the resulting substrate made of transparent organic glass has at least one thin surface layer polymerized to a degree of progression and/or of crosslinking which is appreciably lower than that of the remainder of the substrate.

The degree of progression of polymerization is the fraction of the reactive functional groups of the polymerizable composition which have effectively reacted during the polymerization which has led to the final substrate.

The degree of crosslinking, also known as density of crosslinking, measures the open or dense nature of the network, that is to say the concentration of bridging points or nodes between chains of the network. The greater this concentration, the greater also is the degree of crosslinking.

An equivalent parameter for measuring the open or dense nature of the network is the mean molecular mass M1 of a link between two consecutive nodes of the network. The network becomes denser as M1 becomes smaller.

The techniques which make it possible to demonstrate differences in degree of progression of the polymerization reaction are well known to those skilled in the art.

In particular, in the case of polymerization reactions involving monomers carrying unsaturated double bonds, the techniques of infrared or NMR spectroscopy are particularly suitable.

In order to characterize the differences in degree of crosslinking, it is possible to use the techniques of swelling in a solvent. The degree of swelling becomes greater as the degree of crosslinking becomes smaller.

It is also possible to carry out glass transition temperature Tg measurements by thermal or thermomechanical analysis or microhardness measurements.

According to a recommended embodiment of the invention, the thin surface layer polymerized to a lower degree of progression and/or of crosslinking is prepared by bringing at least one surface of the polymerizable composition into contact with a polymerization inhibitor and/or a chain transfer agent. The polymerization inhibitor and/or the chain transfer agent diffuses and enters under the surface of the polymerizable composition in a low thickness. Thus, during the polymerization, the layer containing the polymerization inhibitor and/or the chain transfer agent polymerizes differently from the remainder of the composition and has, at the end of the polymerization stage, a degree of progression and/or of crosslinking which is lower than that of the remainder of the polymerized and/or crosslinked substrate.

Very obviously, the degree of progression and/or of crosslinking of the thin surface layer depends on the nature of the inhibitor and/or chain transfer agent, on the level of inhibitor and/or of chain transfer agent diffused into the composition and on the polymerization conditions.

It is also possible to produce the thin surface layer with a lower degree of progression and/or of crosslinking by coating at least one surface of the mould in contact with at least one surface of the polymerizable composition with a layer of a composition containing a polymerization inhibitor and/or a chain transfer agent. The polymerization inhibitor diffuses into the polymerizable composition during the polymerization so that it causes a delay in the initiation of the reaction in the portion of the composition which is inhibited. The chain transfer agent, for its part, intervenes by limiting the degree of crosslinking of the surface layer into which it has diffused. By adjusting the polymerization conditions, it is possible to obtain a polymerized substrate containing a thin surface layer having a degree of progression and/or of crosslinking which is lower than that of the remainder of the substrate.

By way of example, it is possible to use, as inhibitor, oxygen or a hydroquinone such as methoxyhydroquinone (MHQ), stabilized by slight acidification of the medium (acetic acid). Other families of inhibitors which are suitable are the quinones, aromatic aldehydes, aromatic nitro compounds and nitroso ketones. The recommended inhibitor is oxygen.

By way of example, mention may be made, as suitable chain transfer agents, of brominated or chlorinated aliphatic hydrocarbons, such as $CCl_4$ or $CHCl_3$, or aliphatic thiols. A particularly appropriate chain transfer agent is diisopropenylbenzene (DIPEB).

Very obviously, the thin surface layer with a lower degree of progression and/or crosslinking is not a layer with a homogeneous degree of progression and/or crosslinking but is, in fact, a layer having a gradient in the degree of progression and/or crosslinking. The degree of polymerization and/or crosslinking of this layer is lower close to the surface and increases, generally, from the surface to the maximum value of the degree of progression and/or of crosslinking reached in the remainder of the substrate.

The thin surface layer with a lower degree of progression and/or of crosslinking generally has a thickness of between 30 µm and 200 µm and preferably between 30 µm and 150 µm. A thickness of approximately between 40 µm and 80 µm is particularly recommended.

The polymerization of the polymerizable composition can be carried out by any known polymerization process. Polymerization processes which are particularly suitable in the present invention are thermally-initiated polymerization and photochemically-initiated polymerization. A polymerization process which is particularly recommended in the process of the present invention is photochemical polymerization by ultraviolet radiation. The ultraviolet radiation used is generally a UV-A radiation. The polymerization conditions very obviously depend on the nature of the polymerizable composition used and on the degree of progression and/or of crosslinking desired for the substrate.

Such thermally-initiated polymerization processes and polymerization processes also initiated by ultraviolet radiation are described, inter alia, in U.S. Pat. No. 5,200,483 and French Patent Application No. 2,699,541.

The substrate is preferably subjected to a conventional stress-relieving anneal which generally consists in heating the substrate obtained in air at a temperature of 100°–120° C. for approximately 1 to 5 hours.

According to a particularly recommended embodiment of the invention, the process for the manufacture of a substrate made of transparent organic glass comprises:

(a) introducing into a mould a composition which is photopolymerizable by ultraviolet radiation into a substrate made of transparent organic glass;

(b) irradiating the polymerizable composition by an ultraviolet radiation in order to partially polymerize the composition and to obtain a prepolymer;

(c) halting the irradiation after obtaining the prepolymer;

(d) bringing at least one surface of the prepolymer into contact with a polymerization inhibitor in order to form an inhibited thin surface layer in the prepolymer;

(e) irradiating the prepolymer having at least one inhibited thin surface layer until polymerization of the prepolymer is complete in order to obtain a substrate made of transparent organic glass having at least one thin surface layer polymerized to a degree of progression which is lower than that of the degree of progression of the remainder of the substrate; and (f) optionally, annealing the substrate.

The surface inhibition of the prepolymer is preferably carried out by bringing at least one surface of the prepolymer into contact with an atmosphere containing a polymerization inhibitor. A particularly recommended inhibitor is oxygen and the atmosphere containing the inhibitor will preferably be air or a gas mixture containing oxygen. It is possible to use other inhibitors depending on the nature of the prepolymer.

The degree of inhibition will depend on the nature of the inhibitor chosen and on the diffusion conditions of the inhibitor. In general, it is recommended that the prepolymer be inhibited to a depth of approximately 40 to 80 μm from the surface exposed to the inhibiting atmosphere, that is to say has a degree of inhibition which is sufficient, at least to such a depth, to make it possible to obtain a surface layer, with a thickness of approximately 40 to 80 μm, which is polymerized to a significantly low degree of progression.

According to another recommended embodiment of the invention, the process for the manufacture of a substrate made of transparent organic gloss comprises:

(a) coating at least one internal surface of the mould with a composition containing a polymerization inhibitor or a chain transfer agent;

(b) introducing into the mould a composition which is polymerizable by an ultraviolet radiation;

(c) irradiating the composition with ultraviolet radiation in order to obtain a substrate made of transparent organic glass having at least one thin surface layer polymerized to a degree of progression and/or of crosslinking which is less than the remainder of the substrate; and (d) optionally, annealing the substrate.

The thickness of the thin layer with a low degree of progression and/or crosslinking will depend on the nature of the inhibitor or of the chain transfer agent, on the nature of the matrix of the polymerizable composition and on the irradiation conditions. This thin layer will preferably have a thickness of approximately 40 to 80 μm. However, thicknesses up to 100 μm are also much desirable.

The polymerizable compositions which are useful in the process of the present invention are known in the art and comprise any composition which can be polymerized to a transparent organic glass.

Such combinations are described, inter alia, in U.S. Pat. Nos. 4,286,957, 4,880,667 and 5,200,483 and French Patent Application No. 2,699,541.

The preferred polymerizable compositions are the polymerizable compositions comprising, as essential component, a monomer or a mixture of monomers polymerizable by the free radical route chosen from vinyl, styrene, polyol (allyl carbonate), acrylic or methacrylic monomers and in particular those described in French Patent Application No. 2,699, 541.

Mention may be made, among (meth)acrylic monomers, of alkyl(meth)acrylates, such as methyl(meth)acrylate, ethyl (meth)acrylate, butyl(meth)acrylate, isobutyl(meth)acrylate, butanediol di(meth)acrylate or trimethylolpropane tri(meth) acrylate, or aryl(meth)acrylates, such as phenyl(meth) acrylate, benzyl(meth)acrylate and phenoxyethyl(meth) acrylate.

The monofunctional monomers belonging to the above list must be used in conjunction with a polyfunctional monomer which makes it possible to provide for crosslinking. Mention may be made, among the allyl carbonate monomers of polyols, of ethylene glycol di(2-chloroallyl) carbonate, diethylene glycol di(2-methallyl)carbonate, diethylene glycol diallyl carbonate, triethylene glycol diallyl carbonate, propylene glycol di(2-ethylallyl)carbonate, 1,3-propanediol diallyl carbonate, 1,3-butanediol diallyl carbonate, 1,4-butanediol di(2-bromoallyl)carbonate, dipropylene glycol diallyl carbonate, trimethylene glycol di(2-ethylallyl) carbonate, pentmethylene glycol diallyl carbonate and isopropylenebisphenol diallyl carbonate. These allyl carbonate monomers of polyols, and their preparation, are more particularly described in U.S. Pat. No. 4,637,698 and No. 5,200,483.

The monomers described in French Patent Application No. 2,699,541 correspond to the formula:

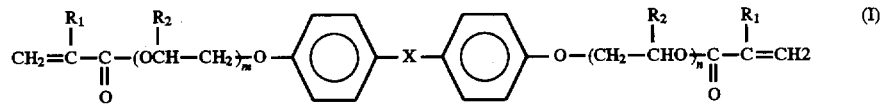 (I)

in which $R_1$ and $R_2$ denote, independently from one another, hydrogen or a lower $C_1$-$C_6$ alkyl radical, X denotes O, S, CO, $SO_2$, —$CH_2$—, —CH=CH—, or

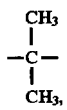

m and n are integers and $0 \leq m+n \leq 10$.

The particularly preferred monomers are diethylene glycol diallyl carbonate and 2,2-bis(4-methacryloxydiethoxyphenyl)propane.

In addition to the monomers mentioned above, the polymerizable compositions which are useful in the present invention can contain minor proportions of other monomers such as urethanes and thiourethanes.

The polymerizable compositions which are useful in the present invention can additionally contain any conventional adjuvant used in the formulation of transparent organic glasses, such as polymerization catalysts, crosslinking catalysts, photoinitiators, anti-yellowing additives, UV absorbers, thermal stabilizers, and the like.

The substrate made of transparent organic glass containing a thin surface layer polymerized to a degree of progression and/or of crosslinking which is lower than that of the remainder of the substrate is a stable product which can be stored and marketed as is for the manufacture of ophthalmic items and in particular with a view to producing a photochromic layer therein.

The present invention therefore also relates to a substrate made of transparent organic glass containing at least one thin surface layer polymerized to a degree of polymerization and/or of crosslinking which is lower than that of the remainder of the substrate.

It is possible to produce a photochromic thin surface layer in the substrate made of organic glass containing a thin surface layer with a lower degree of progression and/or of crosslinking by any known photochromatization process and in particular by impregnation or by thermal transfer of a photochromic substance.

The impregnation process is described in U.S. Pat. No. 4,289,497.

The preferred process according to the present invention is the thermal transfer process. This process is described in U.S. Pat. No. 4,286,957 and No. 4,880,667.

The process applied to the present invention comprises bringing the surface of the substrate adjacent to the thin surface layer with a lower degree of progression and/or of crosslinking into contact with a photochromic material and applying heat to the photochromic material in contact with the substrate. The photochromic substance of the material diffuses into the thin surface layer and a substrate made of transparent organic glass containing a thin surface layer containing the photochromic substance is thus obtained.

Any appropriate photochromic substance can be used for the photochromatization. Such photochromic substances are known and described in U.S. Pat. No. 4,166,043, No. 4,286,957, No. 4,367,170 and No. 4,880,667.

The photochromic material is preferably applied to the surface of the substrate in the form of a film of the photochromic substance dispersed in an appropriate varnish.

Mention may be made, among photochromic substances which are useful in the present invention, of spiropyrans, metal dithizonates, spirooxazines and chromenes.

The preferred photochromic substances according to the invention are spirooxazines and chromenes.

Spirooxazines are known photochromic substances and are described more particularly in U.S. Pat. No. 4,637,698.

Chromenes are also well-known photochromic substances which are described, inter alia, in U.S. Pat. No. 5,066,818 and French Patent Application No. 2,688,782.

The present invention therefore also relates to a process for the manufacture of a substrate made of transparent organic glass containing at least one thin surface layer containing a photochromic substance and whose degree of progression and/or of crosslinking is lower than that of the remainder of the substrate and which comprises introducing the photochromic substance by bringing the surface adjacent to the skin surface layer with a lower degree of advancement and/or of crosslinking of a substrate obtained by the process described above into contact with a material containing a photochromic substance, and diffusing the photochromic substance into this layer. Thermal transfer is preferably used according to the invention to introduce the photochromic substance into the thin surface layer.

The invention also relates to a substrate made of transparent organic glass containing at least one thin surface layer comprising a photochromic substance and whose degree of progression and/or of crosslinking is lower than that of the-remainder of the substrate.

Still more preferably, the substrate is a photochromic ophthalmic item such as an ophthalmic lens or spectacle glasses.

The continuation of the description refers to the appended Figures which represent, respectively:

FIG. 1, a schematic representation of a mould for the manufacture of a substrate made of organic glass according to the invention;

FIGS. 2a to 2i, schematic representations of the stages of a preferred implementation of the process according to the invention; and FIG. 3, a graph of the rate of progression of the polymerization according to the depth within a substrate of the invention.

With reference to FIG. 1, a mould for the manufacture of a substrate made of transparent organic glass which is useful in the process of the present invention has been schematically represented.

The mould 1 comprises two parts made of inorganic glass 2 and 3, one of these parts at least having the required surface geometry for producing a semi-finished optical or ophthalmic item or substrate.

Quite clearly, if it is desired to obtain a finished ophthalmic item or substrate, the two mould parts 2 and 3 will have to be provided with the required surface geometry.

The parts 2 and 3 of the mould are held in place by side parts 4 and 5 of the mould and by leakproof seals 6 and 7, for example made of EVA, or by an appropriate adhesive tape.

A recommended implementation of the process of the invention will now be described in connection with FIGS. 1 and 2a to 2i.

A composition which is polymerizable by ultraviolet radiation 8 is introduced into the cavity of the mould between the mould parts 2 and 3.

Figure 2A:
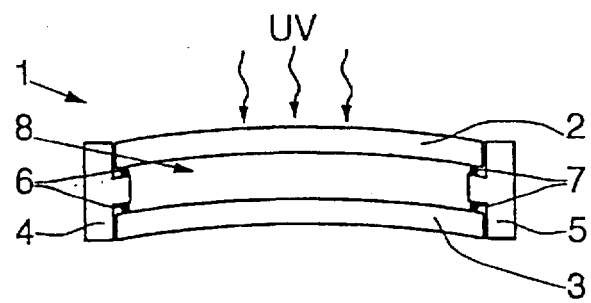

As shown in FIG. 2a, the mould is passed under a UV lamp with a chosen power and for an exposure time such that the polymerization of the composition is incomplete, in order to obtain a prepolymer.

The conditions for producing the prepolymer very clearly vary as a function of the nature of the composition which is polymerizable by ultraviolet radiation. In general, a UV-A radiation is used, so as to obtain, on the surface of the composition, a surface energy preferably of between 1.5 and 6 $J/cm^2$ for a time of preferably between 5 and 60 seconds. At this stage, the degree or rate of progression of the substrate, to the core, is preferably ranging from 75 to 85%.

Figure 2B:
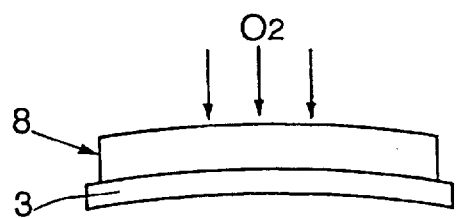

As shown in FIG. 2b, the mould 1 is removed and one of the surfaces of the prepolymer is exposed to an atmosphere containing oxygen, for example air. When air at room temperature is used as atmosphere containing oxygen, the exposure time is generally between 5 and 30 minutes, preferably between 10 and 20 minutes and better still is approximately 15 minutes. Very clearly, the exposure times depend on the temperature used for the diffusion of the inhibitor and are reduced when the diffusion temperature is increased.

Under these conditions, an inhibited thin surface layer is obtained having a depth of between 30 µm and 200 µm and preferably of the order of approximately 40 to 80 µm.

Figure 2C:
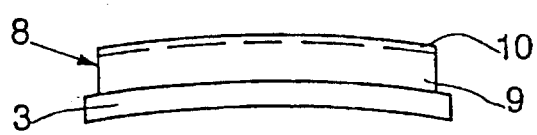

FIG. 2c shows such a prepolymer 8 containing a thin surface layer 10 which is inhibited with respect to the underlying part 9 of the prepolymer.

Figure 2D:
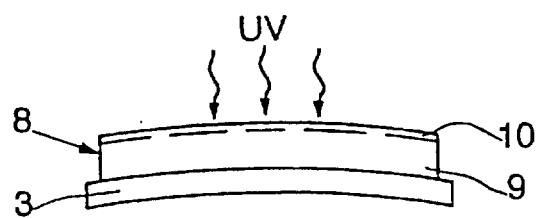

As shown in FIG. 2d, the prepolymer containing an inhibited thin surface layer 10 is then again introduced under a UV, preferably UV-A, radiation lamp and is irradiated in the surrounding atmosphere, for example air, in order to complete the polymerization in the noninhibited part 9 of the prepolymer. The intensity of the radiation and the duration of irradiation of course depend on the nature of the prepolymer and on the desired degree of polymerization. A UV-A radiation is preferably used so as to obtain, on the surface of the prepolymer, a surface energy preferably of between 7 and 25 $J/cm^2$ for a period of time preferably of between 60 and 300 seconds more.

Figure 2E:
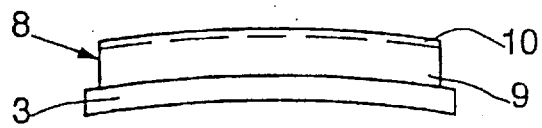

After a conventional stress-relieving anneal at a temperature generally of between 100° and 120° C. for approximately 1 to 5 hours in the presence of an atmosphere containing oxygen, for example air, a substrate made of transparent organic glass is obtained containing a thin surface layer 10 polymerized to a degree of progression which is significantly lower than that of the remainder 9 of the substrate, as represented in FIG. 2e. This thin surface layer preferably has a thickness ranging from 40 to 80 µm. At this stage, the degree or rate of progression within the thin surface layer decreases in relation with the distance from the substrate core of a value ranging from 5 to 20% with regard to the degree or rate of progression within the core of the substrate.

The substrate made of transparent organic glass obtained, represented in FIG. 2e, is stable and can be stored and marketed as is.

Nevertheless, a photochromatization of this substrate is preferably carried out, for example by thermal transfer.

Figure 2F:
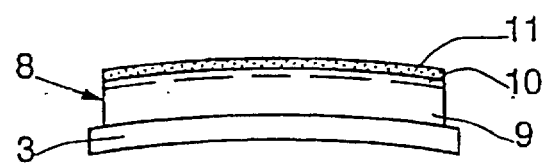

As shown in FIG. 2f, in order to carry out this photochromatization by thermal transfer, a thin film 11 of a photochromic material, for example a varnish containing a photochromic substance, is deposited on the surface of the substrate adjacent to the thin surface layer 10 with a lower degree of progression.

Figure 2G:
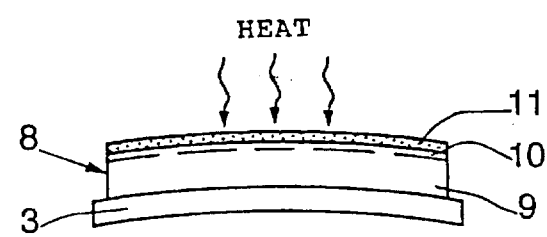

Once the thin film 11 of photochromic material is applied to the surface of the substrate, the combined substrate and film 11 is heated, as shown in FIG. 2g, in order to diffuse the photochromic substance from the film 11 of photochromic material into the thin surface layer with a lower degree of progression 10. The transfer temperatures are in general between 100° and 250° C. and preferably between 125° and 160° C., approximately.

The duration of the thermal transfer is generally between 15 minutes and 60 minutes and is preferably approximately 30 minutes.

Figure 2H:
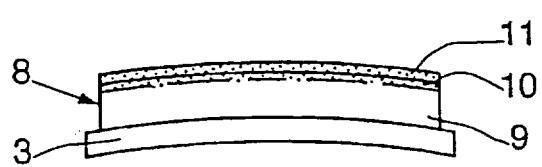

An assembly containing a substrate made of transparent organic glass provided with a photochromic thin surface layer 10 whose degree of progression is lower than that of the remainder 9 of the substrate and a film 11 depleted in photochromic substance, as represented in FIG. 2h, is thus obtained.

Figure 2I:
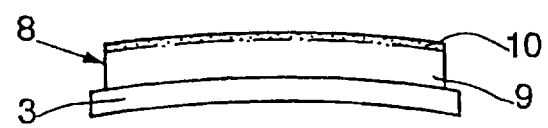

The film of photochromic material 11 is then removed by any known appropriate process, and in particular by peeling, in order to obtain the ophthalmic item or substrate made of transparent organic glass containing a photochromic thin surface layer 10 whose degree of progression is lower than that of the remainder 9 of the substrate or of the item, as represented in FIG. 2i.

By using the process of the present invention, ophthalmic items and substrates made of transparent organic glass are obtained which exhibit a better compromise between the thermomechanical properties and the photochromic properties, in particular the optical density and the lightening rate, while making possible the use of a wide variety of organic glass compositions.

The optical or ophthalmic items and substrates obtained by the process of the present invention, when they constitute semi-finished items and substrates, have thermomechanical properties which make possible surfacing operations without risk of deformation of or damage to the items and substrates.

EXAMPLE 1

Four ophthalmic substrates having a thickness at the centre of 2 mm are manufactured from the following polymerizable composition:

|  | % by weight |
|---|---|
| Tetrathoxybisphenol-A dimethacrylate (corresponding to the monomer of formula (I) in which m + n = 4) | 98 |
| 3-Methyl-2-buten-1-ol | 2 |
| Darocur ® 4265 photoinitiator | 0.15 parts by weight |

Two of the substrates are manufactured by using the preferred photopolymerization process according to the invention described above and two substrates are manufactured by a conventional polymerization process without an inhibition stage. The conditions and parameters used in these processes are collated in Table I below.

In order to have entirely comparative results, the substrates manufactured according to the conventional process are also subjected to a prepolymerization and polymerization stage where the irradiation is the same as in the process according to the invention.

The substrates manufactured by the process according to the invention are denoted by "substrate 1 and 2" while the substrates manufactured by the conventional process are denoted by "substrate A and substrate B".

TABLE I

| | POLYMERIZATION CONDITIONS ||||||||
|---|---|---|---|---|---|---|---|---|
| | PREPOLYMERIZATION BY UV-A || INHIBITION ||| POLYMERIZATION BY UV-A || ANNEAL ||
| | SURFACE ENERGY ON THE COMPOSITION | TIME | INHIBITION ATMOSPHERE | TEMPERATURE | TIME | SURFACE ENERGY ON THE PREPOLYMER | TIME | TEMPERATURE | TIME |
| SUBSTRATES 1 AND 2 | 3.42 J/cm² | 30 s | air | room 20° C. | 15 minutes | 17.53 J/cm² | 300 s | 120° C. | 1 h |
| SUBSTRATES A AND B | 3.42 J/cm² | 30 s | | | | 17.53 J/cm² | 300 s | 120° C. | 1 h |

The graph of FIG. 3 represents the rate of progression of substrate 1 (or substrate 2), obtained by inhibiting with oxygen, measured by RAMAN microscopy, and before photochromatization. As shown in the graph, at a depth of about 80 μm the rate becomes constant at a value of about 92.4%. The rate decreases practically continuously from this depth to the surface, reaching a value of about 81.5% for a depth of about 15 μm, i.e. a decrease of about 12%.

The substrates are subjected to a photochromatization by thermal transfer by using two photochromic varnishes having the following general composition, expressed by weight:

| cellulose acetobutyrate | 18% |
| photochromic compound | 2% |
| methyl ethyl ketone (solvent) | 80% |

In the first varnish, the photochromic compound is a spirooxazine of formula:

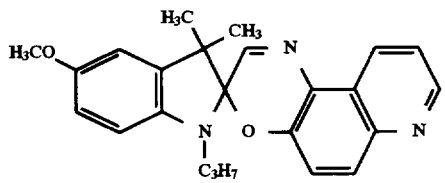

This compound is described more particularly in Patent Application WO-90/12819.

In the second varnish, the photochromic compound is a chromene of formula:

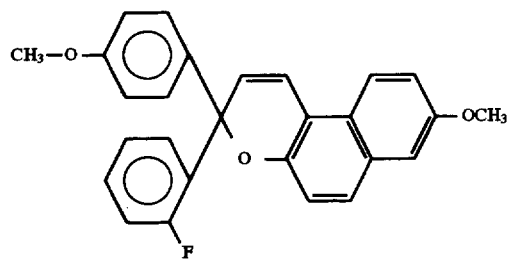

This compound is described more particularly in Patent Application WO-90/17071.

The substrates 1 and A are coated with the first varnish and the substrates 2 and B with the second varnish.

The substrates 1 and 2 are coated with the varnish on their face adjacent to the thin surface layer with a lower degree of progression.

The coated substrates are placed in an oven and heated at 135° C. for 30 minutes. The substrates are removed and left to cool to room temperature while exposed to the air. The varnish films are then removed by peeling.

The maximum optical density $OD_{15}$ at 20° C. of the photochromic substrates obtained is measured in the following way:

The substrates are illuminated for 15 minutes with a 150 watt xenon lamp having a surface radiation flux of 0.5 mW/cm$^2$ in the ultraviolet with a wavelength of between 300 and 400 nm and a light illumination of 13 klux in the visible.

After this irradiation for 15 minutes, the optical density of each of the substrates is measured at the wavelength corresponding to the absorption maximum in the visible of the photochromic compound incorporated in the substrate. This optical density is the maximum optical density $OD_{15}$.

After irradiating for 15 minutes and switching off the xenon lamp, measurement of the optical density is continued. A record is made, for each substrate, of the time at the end of which the optical density reaches the value:

$$OD = OD_{15} - \left[ \frac{OD_{15} - OD_0}{2} \right]$$

where $OD_0$ is the optical density of the substrate in the initially non-excited state.

This time (lightening t ½) is known as the lightening half-life.

The results of these measurements are given in Table II below.

TABLE II

| | PHOTOCHROMIC COMPOUND | $OD_{15}$ | LIGHTENING t 1/2 (seconds) |
|---|---|---|---|
| SUBSTRATE 1 | Spirooxazine | 1.42 | 129 |
| SUBSTRATE A comparative | Spirooxazine | 0.54 | 247 |
| SUBSTRATE 2 | Chromene | 1.68 | 380 |
| SUBSTRATE B comparative | Chromene | 0.52 | 1,260 |

The photochromic substrates obtained by the process of the invention have maximum optical densities which are markedly greater than those of the items obtained by complete direct polymerization. They also have much better lightening rates after irradiation, as shown by the comparison of the lightening half-lives.

EXAMPLE 2

A solution containing, by weight, 2% of cellulose acetobutyrate, 0.03% of a surface-active agent (fluorinated silane FC430) and 10% of a chain transfer agent (diisopropenylbenzene) is prepared by dissolving the components in an appropriate solvent, in the present case methyl isobutyl ketone.

The internal surface of the concave part of the mould is coated by centrifuging (spin coating) with the solution prepared previously. The solvent is evaporated by placing the coated concave part of the mould in an air oven at room temperature for 30 minutes.

The thus coated concave part of the mould is assembled with the convex part of the mould and the composition of Example 1 is poured into the mould. The cast composition is then irradiated by UV-A under the conditions indicated in Table I for the substrates A and B.

After removing from the mould, a substrate made of organic glass is obtained which has a thickness at the centre of 2 mm and which has a thin surface layer polymerized to a degree of progression which is significantly lower than that of the remainder of the substrate.

The substrate made of organic glass is then photochromatized as in Example 1.

The behaviour of the photochromic substrate obtained ($OD_{15}$; t ½) is of the same order as that of the substrates 1 and 2 of Example 1.

EXAMPLE 3

Example 2 is repeated, the chain transfer agent in the solution being replaced by a polymerization inhibitor, namely methoxyhydroquinone.

The photochromic substrate obtained has a behaviour analogous to that of the substrates 1 and 2 of Example 1.

We claim:

1. Process for the manufacture of an optical or ophthalmic item comprising a substrate made of transparent organic glass which comprises:

(a) introducing into a mould a composition which is polymerizable into a transparent organic glass;

(b) bringing at least one surface of the polymerizable composition into contact with a polymerization inhibitor and/or a chain transfer agent under such conditions that said polymerization inhibitor and/or chain transfer agent diffuses into said composition to a depth ranging from 30 µm to 200 µm; and (c) polymerizing the composition under conditions such that the resulting substrate made of transparent organic glass has at least one thin surface layer having a thickness ranging from 30 µm to 200 µm polymerized to a degree of progression and/or of crosslinking which is appreciably lower than that of the remainder of the substrate.

2. The process according to claim 1, which additionally comprises, after step (c) of polymerizing and/or crosslinking:

(d) thermally annealing the substrate for relieving stress therein.

3. The process according to claim 1, wherein the polymerization inhibitor is selected from the group consisting of oxygen, hydroquinones, quinones, aromatic aldehydes, aromatic nitro compounds and nitroso ketones and the chain transfer agent is selected from the group consisting of brominated aliphatic hydrocarbons, chlorinated aliphatichydrocarbons, aliphatic thiols and diisopropenylbenzene.

4. Process for the manufacture of an optical or ophthalmic item comprising a substrate made of transparent organic glass, which comprises:

1) partially polymerizing a polymerizable composition in order to form a prepolymer;

2) bringing at least one surface of the prepolymer into contact with a polymerization inhibitor and diffusing the polymerization inhibitor into the prepolymer in order to form at least one inhibited thin surface layer in the prepolymer, having a thickness of 30 to 200 µm; and 3) resuming the polymerization of the prepolymer in order to obtain the substrate made of transparent organic glass containing at least one thin surface layer having a thickness of 30 to 200 µm polymerized to a degree of progression which is significantly lower than that of the remainder of the substrate.

5. The process according to claim 4, wherein the polymerization inhibitor is air, oxygen or a gas mixture containing oxygen.

6. The process according to claim 1, wherein the polymerization inhibitor and/or chain transfer agent is deposited in the form of a coating on an internal face of the mould.

7. The process according to claim 1, wherein the polymerizable composition is a photopolymerizable composition and wherein the polymerization stage is a photopolymerization stage.

8. The process according to claim 1, wherein the polymerizable composition comprises a monomer or a mixture of monomers selected from the group consisting of vinyl monomers, polyol allyl carbonate monomers, acrylic monomers, methacrylic monomers, and monomers corresponding to the formula:

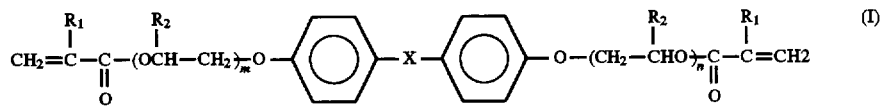

in which $R_1$ and $R_2$, which are identical or different, denote hydrogen or a $C_1$–$C_6$ alkyl;

X denotes —O—, —S—, —CO—, —SO$_2$—, —CH$_2$—, —CH=CH—, or $$-C\begin{matrix}CH_3\\ \\CH_3,\end{matrix}$$

m+n are integers and $0 \leq m+n \leq 10$.

9. The process according to claim 1, wherein the composition is a photopolymerizable composition and comprises a polymerization photoinitiator.

10. The process according to claim 1, wherein the thin surface layer has a thickness ranging from 30 to 150 µm.

11. The process according to claim 1, wherein the thin surface layer has a thickness ranging from 40 to 80 µm.

12. An ophthalmic or optical item comprising a substrate made of transparent organic glass, wherein the substrate comprises at least one thin surface layer having a thickness of 30 to 200 µm polymerized to a degree of progression and/or of crosslinking which is significantly lower than that of the remainder of the substrate.

13. The optical or ophthalmic item according to claim 12, wherein the item is a semi-finished item.

14. Process for the manufacture of an optical or ophthalmic item comprising a substrate made of photochromic transparent organic glass which comprises:

producing a substrate by a method which comprises:

(a) introducing into a mould a composition which is polymerizable into a transparent organic glass; and (b) polymerizing the composition under conditions such that the resulting substrate made of transparent organic glass has at least one thin surface layer polymerized to a degree of progression and/or of crosslinking which is appreciably lower than that of the remainder of the substrate bringing at least the surface adjacent to the thin surface layer with a lower degree of progression and/or of crosslinking into contact with a photochromic substance and diffusing the said photochromic substance into the said thin surface layer.

15. The process according to claim 14, wherein the photochromic substance is brought into contact and diffused by a thermal transfer process.

16. An optical or ophthalmic item comprising a substrate made of photochromic transparent organic glass, wherein the substrate comprises at least one thin surface layer containing a photochromic substance, the said thin surface layer being polymerized to a degree of progression and/or of crosslinking which is significantly lower than that of the remainder of the substrate.

17. The optical or ophthalmic item according to claim 16, wherein the item is a semi-finished item.

* * * * *

UNITED STATES PATENT AND TRADEMARK OFFICE
CERTIFICATE OF CORRECTION

PATENT NO. : 5,730,911
DATED : March 24, 1998
INVENTOR(S) : Cano et al.

It is certified that error appears in the above-identified patent and that said Letters Patent is hereby corrected as shown below:

In column 1, line 16, delete "glass" and insert --glass,--.

In column 1, line 17, delete "its" and insert --items--.

In column 6, line 21, delete "pentmethylene" and insert --pentamethylene--.

In column 7, line 59, delete "the-remainder" and insert --the remainder--.

Signed and Sealed this

Twenty-second Day of September, 1998

Attest:

BRUCE LEHMAN

Attesting Officer      Commissioner of Patents and Trademarks